Patented Apr. 14, 1925.

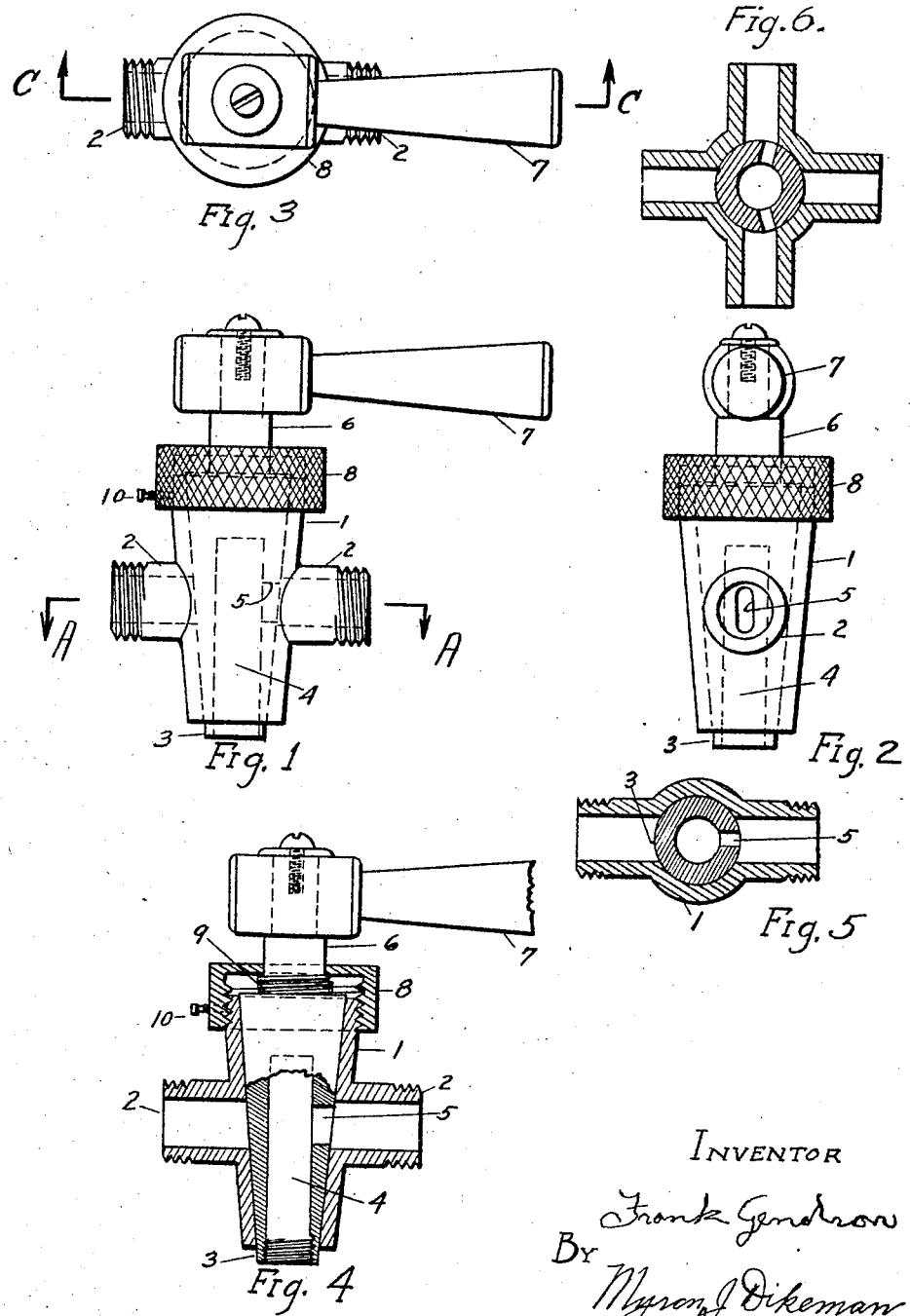

1,533,177

UNITED STATES PATENT OFFICE.

FRANK GENDRON, OF DETROIT, MICHIGAN.

MULTIPLE VALVE.

Application filed February 18, 1924. Serial No. 693,541.

*To all whom it may concern:*

Be it known that I, FRANK GENDRON, a citizen of the United States, residing in the city of Detroit, county of Wayne, State of Michigan, have invented certain new and useful Improvements in a Multiple Valve, and declare the following to be full, clear, and exact description of the same, such as will enable others skilled in the art to which it pertains to make and use the same, reference being had to the accompanying drawings, which form a part of these specifications.

The object of my invention is to provide a valve having multiple inlet pipes, which can be operated by a single valve stem.

A further object is to produce a valve that can be turned to any single inlet pipe desired, and without opening the other inlet pipes.

It is often desired to conduct liquids from various tanks, or compartments, into a single tank, as for compounding various ingredients, and my multiple valve is adapted to that purpose, also for changing the flow of various liquids into a common outlet pipe.

A still further object is to provide a valve that is simple in construction, easily and efficiently operated and can be manufactured at a low cost.

These several objects are secured in their preferred form by the construction and arrangements of parts more fully hereinafter set forth.

Similar parts on all drawings are marked by similar numerals.

Fig. 1, shows a side view of the multiple alve having two inlet pipes leading to the ralve chamber.

Fig. 2, is a side view of the valve showing one of the inlet pipes and the valve port opening therein.

Fig. 3, is a top view of the valve.

Fig. 4, is a section —CC— of Fig. 3, showing the details and the general construction of the valve.

Fig. 5, is a section view —AA— in Fig. 1, showing the position of the valve port as it is opened into one of the inlet pipes.

Fig. 6, is a modified form of the two port valve having the port openings at one side of the valve so that a slight movement of the valve stem will close either one of the ports and allow the other to continue, or close both ports.

I will now describe more fully the detailed construction of my valve, referring to the drawings and the marks thereon.

The general construction of my multiple connection valve consists of a cast valve casing provided with a tapered valve chamber extending through the body of the casting, and inlet pipe connections projecting from the side of the casting, and at right angles thereto. The inlet pipe connections open directly into the valve chamber, same being closed by a tapered plug valve fitted into the chamber, but which is free to turn therein in such a manner that the port in the valve plug may be brought into the opening of any of the inlet connection openings.

The valve casting may be made of any suitable material, but preferably of brass, and is formed with a hollow body casting —1—, having the inlet pipes —2— projecting from the sides thereof. The hollow conical opening inside the body casting —1— is turned true and smooth to receive the tapered valve plug —3—, and forming a tight joint therewith. The inlet pipes —2— lead directly into the valve chamber, and are threaded on the outer end thereof to receive pipe connections leading from said valve. The tapered valve plug —3— is made also with a true turned surface and fits closely the chamber walls in the body casting —1—. The taper valve plug is also provided with a chamber —4— which is open at the lower end of the plug stem. In the side of the taper valve —3—, and leading into the plug chamber —4—, is a valve port —5—, completing a passage from the inlet pipe connection, into the valve chamber —4— from whence it passes from the valve. The taper plug valve —3— is provided with a cylindrical valve stem —6—, fixedly attached thereto. To the valve stem —6— is attached a valve handle —7—, forming a means for turning the valve plug —3— within the valve chamber in the casing —1—. The top end of the valve casing —1— is threaded to receive an adjusting cap —8— which fits over the valve stem —6—, and also retains thereunder an adjusting valve spring —9—, which presses downward on the tapered plug valve —3—, holding same firmly in position in the valve chamber. By varying the position of the cap —8— on the casing —1—, the tension of the spring —9— may also be varied to change the pressure on the valve. The cap —8— is held in position on the casing —1— by means of the set screw —10—. In operating the valve, the handle —7— may be turned in either direction, until the valve port —5— is over one of the openings in the inlet pipe connections on the side of the casing —1—, thus allowing the flow of liquid from the inlet pipe to pass through the valve chambers and out of the valve. By turning the valve handle around the port —5— may also be brought over the other intake pipe, causing a flow of liquid leading through its intake pipe. Should the valve be installed in a water system, the intake connections would be attached to the hot and cold water supply tanks, and the user could draw from each supply as desired, and by the operation of a single valve stem.

A modified form of my multiple valve is illustrated in Fig. 6. This form shows only a four way intake system, while a further modification could easily be made by changing the number of intake connections, the valve stem and plug being the same as in the other form, and operated in the same manner. Fig. 6 illustrates a further modification of the taper valve plug, by providing two ports therein instead of a single port. Both ports lead through the walls of the valve and into the plug chamber —4—, and are positioned on opposite sides of the valve plug and placed to one side of the center as is shown in Fig. 6 allowing the passage from opposite inlet pipes to be opened at the same time and by slightly turning the valve plug in either direction in the valve chamber, one of the ports is closed while the remaining port may continue to be opened in the inlet passage. A further position may be reached where both ports are completely closed, and the valve sealed.

Having fully described my multiple valve, what I claim as my invention and desire to secure by Letters Patent is:

A mechanical regulating valve adapted for operation with several connecting intake pipes, comprising a valve casing having a conical valve chamber therein and having two or more intake pipes opening into the sides of said valve chamber and at right angles to the axis of said chamber, said intake openings being of the full size of the connecting intake pipes, and so spaced as to leave intervening valve wall sections between the pipe openings at least equal to the width of the pipe openings, a tapered valve plug fitting into and engaging the said conical valve casing chamber, an inner plug chamber within said valve plug and open at the bottom of said plug, means for continuing said plug valve chamber beyond the casing, two slotted valve ports through the walls of the valve plug opening into the inner plug chamber, said slotted ports being arranged parallel to the axis of said plug and having a width of opening less than half of the width of the intake pipe openings, said ports so positioned in the valve plug walls that two adjacent edges of the slotted valve ports are at the edges of the inlet pipe openings, and having the full valve ports open in the inlet opening, such as will allow for the varying or closing of either valve port without varying or closing the other port therein, and which on further rotation of the valve plug within the casing will close both ports, a valve cap attached to said valve casing, a coil spring operating between said valve cap and the end of the valve plug for holding said valve plug firmly within the said valve chamber and a valve handle for rotating said plug valve therein.

In witness whereof I sign these specifications.

FRANK GENDRON.